United States Patent [19]

Nemoto

[11] 4,203,564

[45] May 20, 1980

[54] TAPE REEL

[75] Inventor: Tsuneo Nemoto, Sendai, Japan

[73] Assignee: Sony Corporation, Tokyo, Japan

[21] Appl. No.: 964,718

[22] Filed: Nov. 29, 1978

[30] Foreign Application Priority Data

Dec. 16, 1977 [JP] Japan ............................ 52/168354[U]

[51] Int. Cl.² ...................... B65H 75/12; B65H 75/18
[52] U.S. Cl. ................................................... 242/71.8
[58] Field of Search .................... 242/71.8, 71.9, 68.5,
242/68.6, 118.3, 118.31, 118.32, 118.4, 118.6,
118.61, 118.62

[56] References Cited

U.S. PATENT DOCUMENTS

| 2,881,985 | 4/1959 | Overmire et al. | 242/71.8 |
| 3,485,456 | 12/1969 | Weyrich et al. | 242/71.8 |
| 4,044,965 | 8/1977 | Posso | 242/71.8 |

*Primary Examiner*—John M. Jillions

*Attorney, Agent, or Firm*—Lewis H. Eslinger; Alvin Sinderbrand

[57] ABSTRACT

A reel on which a web, such as magnetic tape, is to wound is formed of molded synthetic resin and comprises a generally cylindrical hollow reel hub, a circular flange at one end of the hub and integrally formed therewith, and a rib portion generally closing off the other end of the reel hub. A circular sub-flange is thermally welded to the rib portion at that end of the reel hub, for instance, by an ultrasonic welding technique. In order to prevent the reel hub, in which the synthetic resin material may have undergone a dimensional change after welding, from causing undulations in an edge of the tape wound on it, the reel hub is provided with a thin cylindrical portion at the same end of the hub as the rib portion. The top of the cylindrical portion is separated from the sub-flange. The thin cylindrical portion can be defined by an annular recess in the end of the hub. In one arrangement, an annular cut-out is provided contiguous with the annular recess and the cut-out receives a mating projection on the sub-flange.

11 Claims, 6 Drawing Figures

TAPE REEL

BACKGROUND OF THE INVENTION

1. Field of the Invention

This invention relates to a reel for a web such as tape, and more particularly, is directed to a tape reel for tape cassette whereon a magnetic tape is wound, the tape cassette being of the type used on magnetic video tape recording and/or reproducing apparatus.

2. Description of the Prior Art

An example of a conventional tape reel for use with a video tape recorder includes a flange and a reel hub which are formed of synthetic resin and integrally molded with each other, thereby forming a so-called "one-flange type" reel. A sub-flange is connected to the other, free end of the hub. The diameter of the sub-flange is smaller than that of the integral flange. The connection of the sub-flange and the hub is as follows. An annular projection of the sub-flange is received in an annular recess which is formed in a hollow portion of the free end of the hub adjacent to a rib which substantially closes off the opening of the end of the hub. Then, the projection on the sub-flange and the recess at the free end of the hub are connected to each other by ultrasonic welding. The tape reel as constructed above becomes deformed by the contraction of the material when the tape reel is merely left to sit for some length of time after the welding. That is, the diameter of the top end of the reel hub becomes large as compared with the diameter of the other end which is reinforced with the rib. Accordingly, a magnetic tape wound on the reel has a tendency to protrude outwards in the radial direction, and will develop a permanent set due to the thermal contraction or the stress of magnetic tape. Hence, the magnetic tape sustains relatively high tension near the upper edge of the tape in the direction across its width. The magnetic tape withdrawn from the reel has an undulating shape like that of "wakame" seaweed, because the upper side edge of the magnetic tape is elongated in respect to the lower side edge thereof. Such magnetic tape will not be able to maintain stable contact with a head drum of a video tape recorder. A special problem occurs when the upper side of the magnetic tape is used as an control track. In such case the recording or reproducing of the control signal by magnetic heads becomes unreliable, causing syncronization errors, and also causing the S/N ratio to fall especially in the lower portion of the reproduced picture.

SUMMARY OF THE INVENTION

One object of this invention is to provide a tape reel which permits the condition of a tape wound thereon to be uniform in the axial direction of the hub of the tape reel.

Another object of this invention is to prevent a tape wound on the tape reel from being extended or stretched at one edge.

A further object of this invention is to minimize the synchronization error and to improve the S/N ratio of signals recorded on the tape led out of a tape reel.

According to an aspect of this invention, a reel is formed of molded synthetic resin on which a web, such as magnetic tape is to be wound. The reel comprises a generally cylindrical hollow reel hub having an inner surface and a cylindrical outer surface and first and second ends, a generally circular flange integrally connected with the hub at the first end thereof, a rib portion formed within the hub substantially closing off the opening at the second end of the hub, and a generally circular sub-flange located at the second end of the hub and thermally welded to the rib portion. In the reel, means are provided to prevent the reel hub from causing deformation of the web or tape wound thereon where such deformation might occur owing to dimensional changes in the synthetic resin material of the hub after welding of the sub-flange to the rib portion. Preferably, such means are provided as a cylindrical portion formed at the second end of the hub extending from the outer surface thereof a portion of the distance to the inner surface, so that the inner surface of the cylindrical portion is separated from the rib portion and so that the top of the cylindrical portion is separated from the sub-flange. This cylindrical portion can be defined by an annular recess between the inner and outer surfaces of the reel hub at the second end thereof. In such case it is preferred that the annular recess extend axially a distance of more than one third the distance from the second toward the first end of the reel hub, and that the cylindrical portion have a thickness of less than half the thickness of the reel hub.

The above, and the other objects, features and advantages of this invention will be apparent from the following detailed description of illustrative embodiments thereof which is to be read in connection with the accompanying drawings.

BRIEF DESCRIPTION OF THE DRAWINGS

FIG. 5 is a cross sectional view of a tape reel according to one embodiment of this invention; and FIG. 6 is a cross sectional view of a tape reel according to another embodiment of the invention.

DESCRIPTION OF THE PREFERRED EMBODIMENTS

Figure 1:
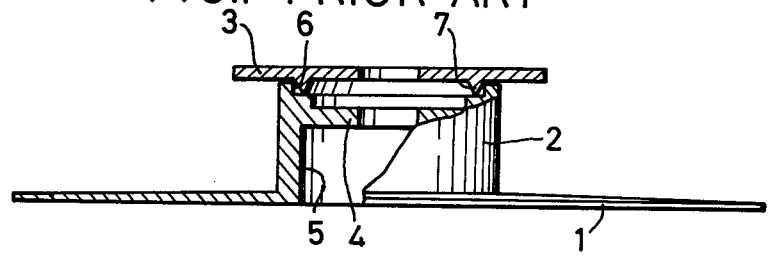
FIG. 1 is a front view of an example of a conventional tape reel, a part of which is broken away.
Figure 2:
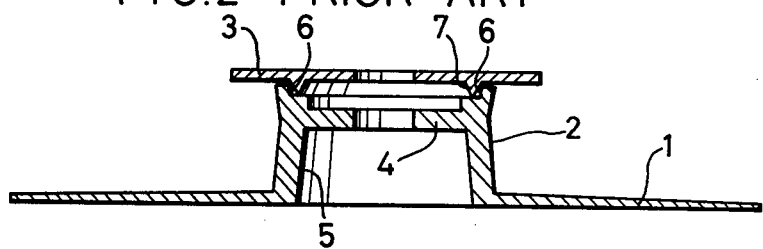
FIG. 2 is a cross sectional view of the conventional tape reel showing the deformation thereof.
Figure 3:
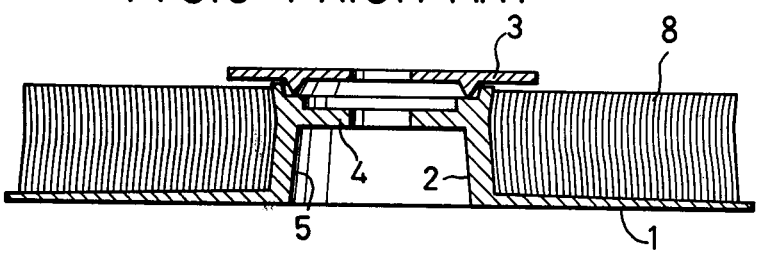
FIG. 3 is a cross sectional view of the conventional tape reel, on which a magnetic tape is wound.
Figure 4:
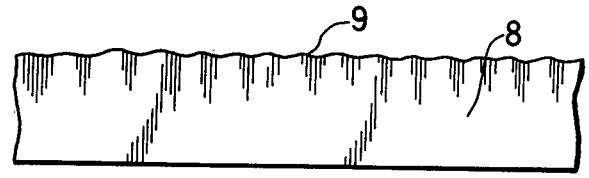
FIG. 4 is a front view of the magnetic tape withdrawn from the conventional tape reel.

Before proceeding with a detailed description of embodiments of this invention, and for the purpose of clearly contrasting the same with conventional tape reels, an example of a conventional tape reel for use with a video tape recorder will be described with reference to FIG. 1. The tape reel is shown to include a flange 1 and a hub 2 which are integrally molded with each other and formed of synthetic resin to form a one-flange type reel. A sub-flange 3 is welded to the free end of the hub 2. The diameter of the sub-flange 3 is smaller than that of the integral flange 1. The welding of the sub-flange 3 to the hub 2 is achieved as follows. An annular projection 7 of the sub-flange 3 is received in an annular recess 6 which is formed at the free end portion of the hub 2 adjacent to a rib 4 in the hub. A hollow portion 5 is formed opposite the recess 6 relative to the rib 4 to receive a reel drive shaft (not shown) in the hub 2. Then, the projection 7 and the recess 6 are connected with each other by ultrasonic welding. The tape reel as constructed above is deformed by the contraction of the material, which will occur after the welding operation when the tape reel is merely left to sit for some length of time. That is, the diameter at the top end of the reel hub 2 becomes greater than the diameter of the portion that is reinforced with the rib 4 as shown in FIG. 2. Accordingly, a magnetic tape 8 wound on the tape reel has a tendency to protrude outwards in the radial direction as shown in FIG. 3 owing to the thermal deformation or the winding stress of the magnetic tape 8, and hence the magnetic tape sustains relatively high tension near the upper edge of the tape 8 in the direction across its width. The magnetic tape 8 withdrawn from the reel after storage thereon has a shape of "wakame" seaweed as shown in FIG. 4 because the upper side edge 9 of the magnetic tape 8 extends or elongates. The contact of the magnetic tape 8 with a head drum of a video tape recorder becomes unreliable.

A special problem arises when the upper edge of the magnetic tape is used as a control track for the recording of a control signal. In such case, as a result of the above-mentioned deformity, the contact between the control track and the recording and reproducing heads becomes unreliable. Hence, recording or reproducing of the control signal becomes uncertain and/or inaccurate. Such inaccuracy in respect to the control signal results in synchronization errors and can also result in a decreased signal-to-noise ratio, especially in the lower portion of the video picture reproduced from the signal recorded on the tape.

Figures 5, 6:
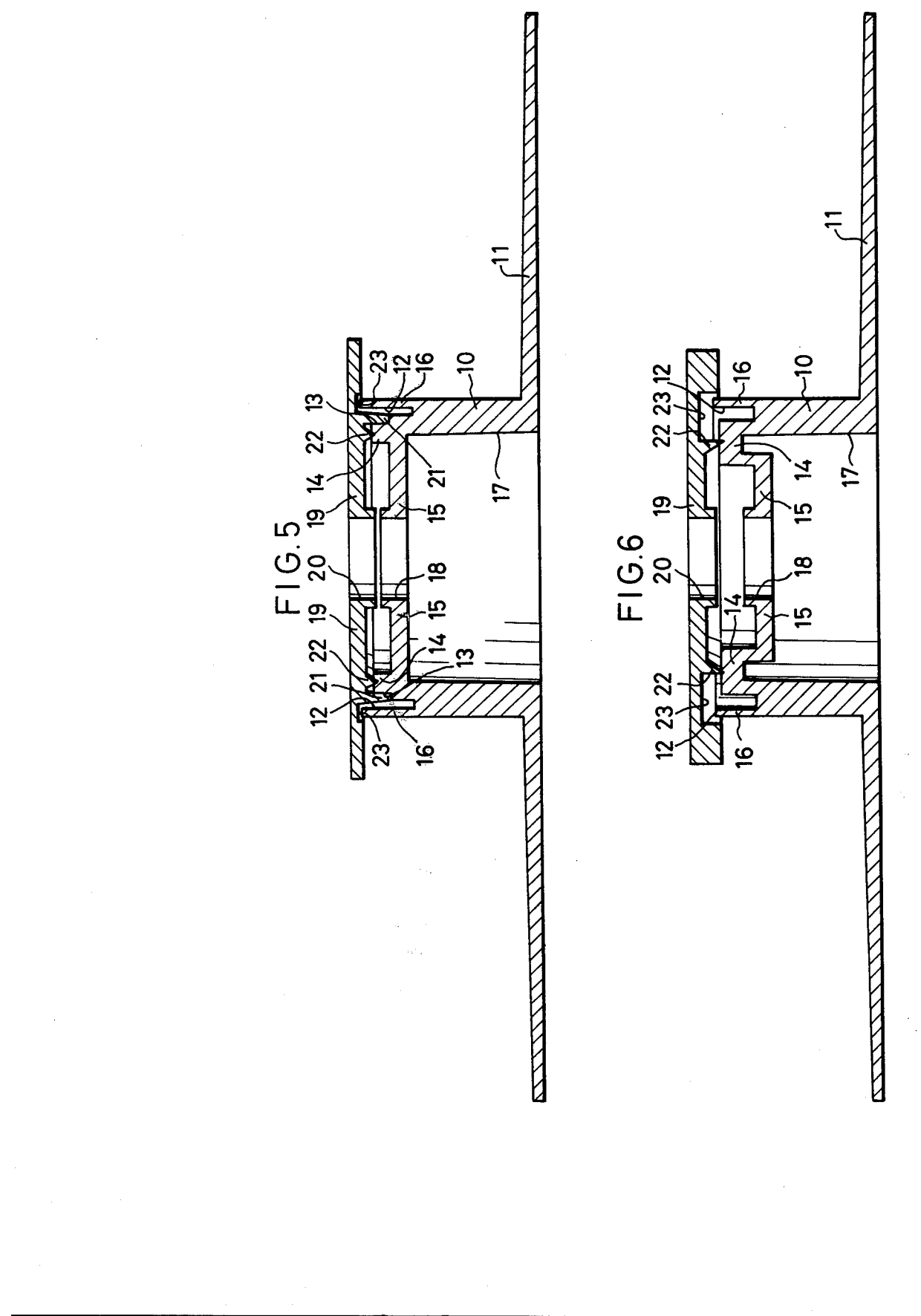

Refering now to FIG. 5, it will be seen that a tape reel according to the first embodiment of this invention, is provided with a cylindrical reel hub 10. The reel hub 10 is moulded integrally with a flange 11. The reel hub 10 has an annular recess 12 at the end thereof opposite the flange 11 and an annular cut-out portion 13 which is contiguous to the recess 12. The hub 10 also has a hollow interior portion 17 extending from the flange 11 to a rib 15 which substantially closes off the interior portion 17 and on which an annular projection 14 is formed. The outside of the projection 14 constitutes a wall of the cut-out portion 13. An annular thin cylinder 16 is defined at the top of the hub 10 by the formation of the recess 12. The reel hub 10 has the hollow portion 17 included for the purpose of receiving a reel drive shaft for driving the reel. For that reason, a round opening 18 is formed at the center of the rib 15 to receive a positioning portion of the reel drive shaft.

The tape reel according to this embodiment is further provided with a sub-flange 19 which has a round opening 20 aligned with the round opening 18. An annular projection 21 is formed on the bottom side of the flange 19 facing the hub 10 at a position corresponding to the annular cut-out portion 13 of the hub 10. Radially inward with respect to the projection 21, either an annular projection or a plurality of separated arcuate projections 22 arranged in a circle are formed on the bottom side of the flange 19. Such projection or projections 22 extend for a lesser distance in the axial direction than the projection 21. Furthermore, at the outside of the projection 21, an annular groove 23 is formed on the bottom side of the flange 19. The annular groove 23 permits the top of the thin cylinder 16 to be separated from the sub-flange 19 when the projection 21 is fitted to the cut-out portion 13 of the hub 10.

The above mentioned reel hub 10 and sub-flange 19 are connected by the engagement of the annular projection 21 and the cut-out portion 13. Then, the projection or projections 22 of the sub-flange 19 and the annular projection 14 of the reel hub 10 are fixed together by ultrasonic welding, whereby the reel is constructed as shown in FIG. 5.

The magnetic tape wound on the above described reel is maintained in an undistorted state in the axial direction of the reel hub 10 because the thin cylinder portion 16 is deformable inwards in the radial direction due to the tension of the magnetic tape. The construction of the reel prevents tape distortion even when the top of the reel hub 10 is subjected to a force tending to expand the top of the reel hub 10 radially outwards owing to the thermal contraction of the welded portion following the ultrasonic welding. Accordingly, the magnetic tape is prevented from being partially stretched in the direction across its width.

The above mentioned thermal deformation of the reel hub 10 is due to the inclusion of the rib 15 in the structure, because the top of the reel hub 10 is deformed outwards in the radial direction relative to the rib 15 when the rib 15 contracts. Accordingly, it may be considered desirable to remove the rib 15. However, such an arrangement will make the reel weak, and will make it difficult to drive the reel by the drive shaft. This invention has the desirable advantage of strength and prevention of tape distortion, since, the reel with a thin cylindrical portion 16 according to the present embodiment prevents degradation in the condition of the magnetic tape wound thereon, despite the presence of the rib 15.

According to some experiments, the depth of the recess 12 is preferred to be more than about one third of the whole axial length of the reel hub 10, and the thickness of the thin cylinder 16 is preferred to be smaller than about half of that of the reel hub 10. By the above specified reel, it was experimentally confirmed that the condition of the magnetic tape across its width was equal in every position corresponding to positions of the reel hub 10 in the axial direction thereof. However, when the recess 12 is made too deep, it will be impossible to withdraw the die for molding the reel hub from the latter during the manufacture, and also the reel hub 10 will become relatively weak. Therefore, the depth of the recess 12 should be selected to be a moderate value in accordance with the property of the material of the reel hub 10, the tension imposed on the magnetic tape, and the quantity of the magnetic tape wound on the reel hub. The thickness of the cylindrical thin portion 16 should also be selected considering the above criteria.

Next, there will be described another embodiment of this invention with reference to FIG. 6 in which elements corresponding to those in the previously described embodiment are identified by the same reference numerals and the detailed description thereof will be omitted. In this embodiment, the annular cut-out portion 13 and the annular projection 21 are omitted. The positioning of the sub-flange 19 relative to the reel hub 10 and flange 11 is effected by a jig when the projection 22 is welded to the projection 14 by the welding. This arrangement makes the reel simple and the dies for molding the reel are simplified. Accordingly, the reel will be practical.

Although illustrative embodiments of this invention have been described in detail with reference to the accompanying drawings, it is to be understood that the invention is not limited to these precise embodiments or the described modification, and that various changes and further modifications may be made therein by one skilled in the art without departing from the scope or the spirit of the invention as defined in the appended claims.

What is claimed is:

1. A reel formed of molded synthetic resin on which a web is to be wound, said reel comprising a generally cylindrical wall defining a hollow reel hub having an inner surface and a cylindrical outer surface and first and second ends, a generally circular flange integrally connected with, and extending radially outward from said hub at the first end thereof, rib means formed within said hub substantially closing said second end of said hub, a generally circular sub-flange located at said second end of said hub and thermally welded to said rib means wherein dimensional changes of the synthetic resin of said hub flange and said rib means occur after welding of said sub-flange to said rib means, and means for isolating said cylindrical outer surface of said reel hub from deformation due to dimensional changes in said sub-flange and said rib means to prevent said reel hub from causing deformation of a web wound thereon.

2. A reel according to claim 1, wherein said sub-flange is welded to said rib means by ultrasonic welding.

3. A reel formed of molded synthetic resin on which a web is to be wound, said reel comprising a generally cylindrical wall defining a hollow reel hub having an inner surface and a cylindrical outer surface and first and second ends, a generally circular flange integrally connected with, and extending radially outward from said hub at the first end thereof, rib means formed within said hub substantially closing said second end of said hub, a generally circular sub-flange located at said second end of said hub and thermally welded to said rib means, means to prevent said reel hub from causing deformation of a web wound thereon wherein such deformation occurs because of dimensional changes of the synthetic resin of said hub after welding of said sub-flange to said rib means, said means to prevent deformation includes a cylindrical portion formed at said second end of said hub and defining a portion of said outer surface thereof, said cylindrical portion having a radial width smaller than the radial width of the remainder of said cylindrical wall defining the hub, said cylindrical portion having an inner surface separated from said rib means and a free end edge separated from said sub-flange.

4. A reel according to claim 3, in which said sub-flange has an annular groove located at the position on said sub-flange corresponding to said cylindrical portion to separate said sub-flange from said free end edge of the cylindrical portion.

5. A reel according to claim 4, wherein said sub-flange has at least one arcuate projection thereon arranged generally in the form of a circle concentric with said annular groove, and each said arcuate projection is thermally welded to said rib means.

6. A reel according to claim 5, wherein said rib means has an annular projection extending axially toward said second end of said reel hub, and on which each said projection is welded.

7. A reel hub according to claim 5, wherein each said arcuate projection is separated from said annular groove.

8. A reel according to claim 3, wherein said cylindrical portion is radially outward of an annular recess formed in said wall between said inner and outer surfaces of said reel hub at said second end thereof.

9. A reel according to claim 8, wherein said second end of said reel hub has an annular cut-out portion contiguous with, and arranged radially inward with respect to said annular recess, and said sub-flange has a mating annular projection which is received by and engaged with said cut-out portion, said cut-out portion and mating projection being arranged to position said sub-flange relative to said reel hub during thermal welding of the sub-flange to the rib means.

10. A reel according to claim 8, wherein said recess extends, in the axial direction of said reel hub, a distance which is more than one third that from said second end to said first end of said reel hub.

11. A reel according to claim 3, wherein said reduce width of the cylindrical portion is less than half the radial width of said cylindrical wall of said reel hub.

* * * * *